(12) United States Patent
Middendorf et al.

(10) Patent No.: US 7,962,246 B2
(45) Date of Patent: Jun. 14, 2011

(54) METHOD AND APPARATUS FOR OPERATING A WIND TURBINE DURING A LOSS OF COMMUNICATION

(75) Inventors: Joerg Middendorf, Holdorf (DE); Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/489,085

(22) Filed: Jun. 22, 2009

(65) Prior Publication Data

US 2010/0133815 A1    Jun. 3, 2010

(51) Int. Cl.
G05D 3/12 (2006.01)
G05B 19/18 (2006.01)
G05B 11/01 (2006.01)

(52) U.S. Cl. ......... 700/287; 700/2; 700/20; 700/21; 700/79; 714/11

(58) Field of Classification Search .......... 700/2, 3, 700/4, 9, 10, 20, 21, 79, 80, 82, 287, 292, 700/297; 714/10, 11; 290/44; 320/101
See application file for complete search history.

(56) References Cited

U.S. PATENT DOCUMENTS

| | | | |
|---|---|---|---|
| 5,907,192 A | 5/1999 | Lyons et al. | |
| 6,327,957 B1 | 12/2001 | Carter, Sr. | |
| 6,609,889 B1 | 8/2003 | Vilsboll | |
| 6,771,903 B1 * | 8/2004 | Cousineau | 398/17 |
| 7,355,294 B2 | 4/2008 | Teichmann | |
| 7,394,166 B2 | 7/2008 | Teichmann et al. | |
| 7,488,155 B2 | 2/2009 | Barbu et al. | |
| 7,569,944 B2 | 8/2009 | Oohara et al. | |
| 2008/0290664 A1 | 11/2008 | Kruger | |
| 2009/0058086 A1 | 3/2009 | Arinaga et al. | |
| 2009/0174186 A1 | 7/2009 | Nyborg | |
| 2009/0174187 A1 | 7/2009 | Nyborg | |
| 2009/0309360 A1 * | 12/2009 | Jurkat | 290/44 |

FOREIGN PATENT DOCUMENTS

WO   WO 2007012487 A1 *  2/2007
WO   WO 2009/010059     *  1/2009

* cited by examiner

Primary Examiner — Sean P Shechtman
(74) Attorney, Agent, or Firm — James McGinness, Esq.; Armstrong Teasdale LLP (57) ABSTRACT

A method for operating a wind turbine during a loss of communication is described that includes coupling a pitch controller to at least one wind turbine blade and to a wind turbine controller, establishing communication between the pitch controller and the wind turbine controller, and detecting a loss of communication between the pitch controller and the wind turbine controller. After a loss of communication is detected, the method further includes waiting for a first predetermined amount of time to elapse, independently pitching the at least one wind turbine blade to a predetermined position, waiting for a second predetermined amount of time to elapse, and maintaining the at least one wind turbine blade in the predetermined position until a rotation of the at least one wind turbine blade stops.

20 Claims, 3 Drawing Sheets

METHOD AND APPARATUS FOR OPERATING A WIND TURBINE DURING A LOSS OF COMMUNICATION

BACKGROUND OF THE INVENTION

The present application relates generally to wind turbines and, more particularly, to a method and apparatus for operating a wind turbine during a loss of communication.

Known wind turbines convert the kinetic energy of wind into electrical energy. Wind turbines include one or more blades that rotate when oncoming wind strikes the blades. The flow of wind over the wind turbine blades generates lift, induces rotation, and provides torque to generate power.

At least some known wind turbines include a plurality of controllers within the turbine that communicate with each other to control internal components of the wind turbine. Such controllers may include, for example, a pitch controller and a wind turbine controller. Known pitch controllers change a pitch angle of the wind turbine blades. More specifically, known pitch controllers may drive the blades to a desired operating pitch angle based on existing wind conditions, to facilitate enhanced operation. The pitch controller may also rotate the blades to a non-operating, or feathered, position to facilitate reducing the amount of lift induced to the blades from the wind. The blades may be feathered to facilitate preventing damage to the wind turbine, for example, during high wind conditions or during wind turbine fault conditions.

Known wind turbine controllers may function as a master controller for the wind turbine system. For example, a known wind turbine controller may be programmed to control other controllers coupled within the wind turbine, such as the pitch controller. In such configurations, the wind turbine controller issues commands or control messages to the other controllers, and the other controllers implement these commands or control messages on the components subject to their control. For example, the wind turbine controller may issue commands to the pitch controller to pitch the blades to a defined position.

However, wind turbine controllers, such as pitch controllers and wind turbine controllers, may suffer periodic losses of communication with each other. Such communication losses may cause undesirable consequences. For example, in one known wind turbine, when a loss of communication occurs between a pitch controller and a wind turbine controller, the wind turbine enters a fault state in which a hard braking procedure is implemented and the rotor blades are stopped via mechanical braking and/or through battery-driven braking procedures. Such procedures may induce an undesirable amount of loading upon the wind turbine system and over time, may reduce the operating life of the wind turbine.

In other known wind turbines, when a loss of communication occurs between a pitch controller and a wind turbine controller, the pitch controller feathers the blades. However, the wind turbine controller is not informed of such pitching because of the loss of communication. As such, if communication is restored, the blades are in a different position than the wind turbine controller expects. Accordingly, when communication is restored, often errors are generated as a result of the discrepancy between an expected blade position and the actual blade position. Depending on the severity and number of errors, resumption of normal operations may be inhibited.

BRIEF DESCRIPTION OF THE INVENTION

In one embodiment, a method for operating a wind turbine during a loss of communication is provided. The method includes coupling a pitch controller to at least one wind turbine blade and coupling the pitch controller to a wind turbine controller. The method also includes establishing communication between the pitch controller and the wind turbine controller and detecting a loss of communication between the pitch controller and the wind turbine controller. After a loss of communication is detected, the method includes waiting for a first predetermined amount of time to elapse, independently pitching the at least one wind turbine blade to a predetermined position, waiting for a second predetermined amount of time to elapse, and maintaining the at least one wind turbine blade in the predetermined position until a rotation of the at least one wind turbine blade comes to a halt.

In another embodiment, a wind turbine including a tower, a nacelle, a hub, and at least one blade is provided. The wind turbine also includes a wind turbine controller and a pitch controller, wherein the pitch controller is coupled to the at least one blade and to the wind turbine controller. The pitch controller is configured to establish communication with the wind turbine controller and to detect a loss of communication with the wind turbine controller. After a loss of communication is detected, the pitch controller is further configured to wait for a first predetermined amount of time to elapse, independently pitch the at least one blade to a predetermined position, wait for a second predetermined amount of time to elapse, and maintain the at least one blade in the predetermined position until a rotation of the at least one blade stops.

In another embodiment, a pitch controller for use in a wind turbine is provided. The pitch controller is coupled to at least one wind turbine blade and to a wind turbine controller. The pitch controller is configured to establish communication with the wind turbine controller and to detect a loss of communication with the wind turbine controller. After a loss of communication is detected, the pitch controller is also configured to wait for a first predetermined amount of time to elapse, independently pitch the at least one wind turbine blade to a predetermined position, wait for a second predetermined amount of time to elapse, and maintain the at least one wind turbine blade in the predetermined position until a rotation of the at least one wind turbine blade stops.

DETAILED DESCRIPTION OF THE INVENTION

Figure 1:
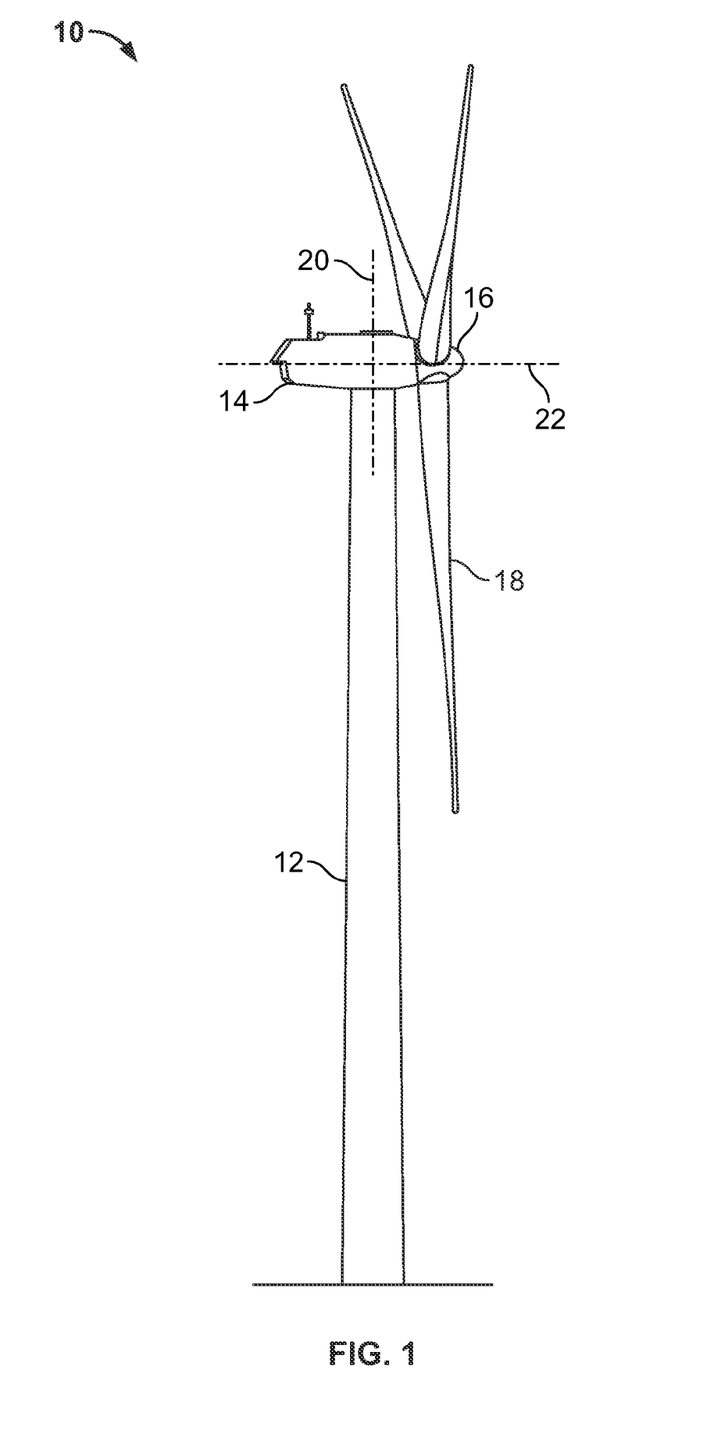
FIG. 1 is a side view of an exemplary wind turbine.

FIG. 1 illustrates an exemplary wind turbine 10. In the exemplary embodiment, wind turbine 10 includes a tower 12, a nacelle 14 that is coupled to tower 12, a hub 16 that is coupled to nacelle 14, and at least one blade 18 that is coupled to hub 16. Tower 12 provides support for nacelle 14, hub 16, and blade 18. Tower 12 may be of such height and construction as is known in the art.

Nacelle 14 is coupled to tower 12. Nacelle 14 houses components (not shown) for use in transforming rotational energy of blade 18 into electricity. Nacelle 14 may be constructed as is known in the art. Hub 16 is coupled to nacelle 14. Hub 16 provides a rotatable housing for at least one blade 18. Hub 16 may be constructed as is known in the art.

At least one blade 18 is coupled to hub 16. In the exemplary embodiment, three blades 18 are coupled to hub 16. Blades 18 are rotatable about an axis of rotation 22 when wind strikes blades 18. In the exemplary embodiment, each blade 18 is oriented substantially perpendicularly to the ground. Each blade 18 rotates through substantially the same plane of rotation and substantially parallel to a centerline axis 20 of tower 12. Each blade 18 may be constructed as is known in the art.

During operation, as wind strikes blades 18, blades 18 rotate about hub 16, and the kinetic energy of the wind is transformed into rotational energy by blades 18. More specifically, a rotation of blades 18 rotates a gearbox (not shown) within nacelle 14. The gearbox is coupled to a generator (not shown) within nacelle 14 which generates electricity. In an alternative embodiment, wind turbine 10 does not include a gearbox, but rather, the electricity is transmitted via a cable assembly (not shown) extending through tower 12. The cable assembly delivers the electricity to a power grid or other destination.

Figure 2:
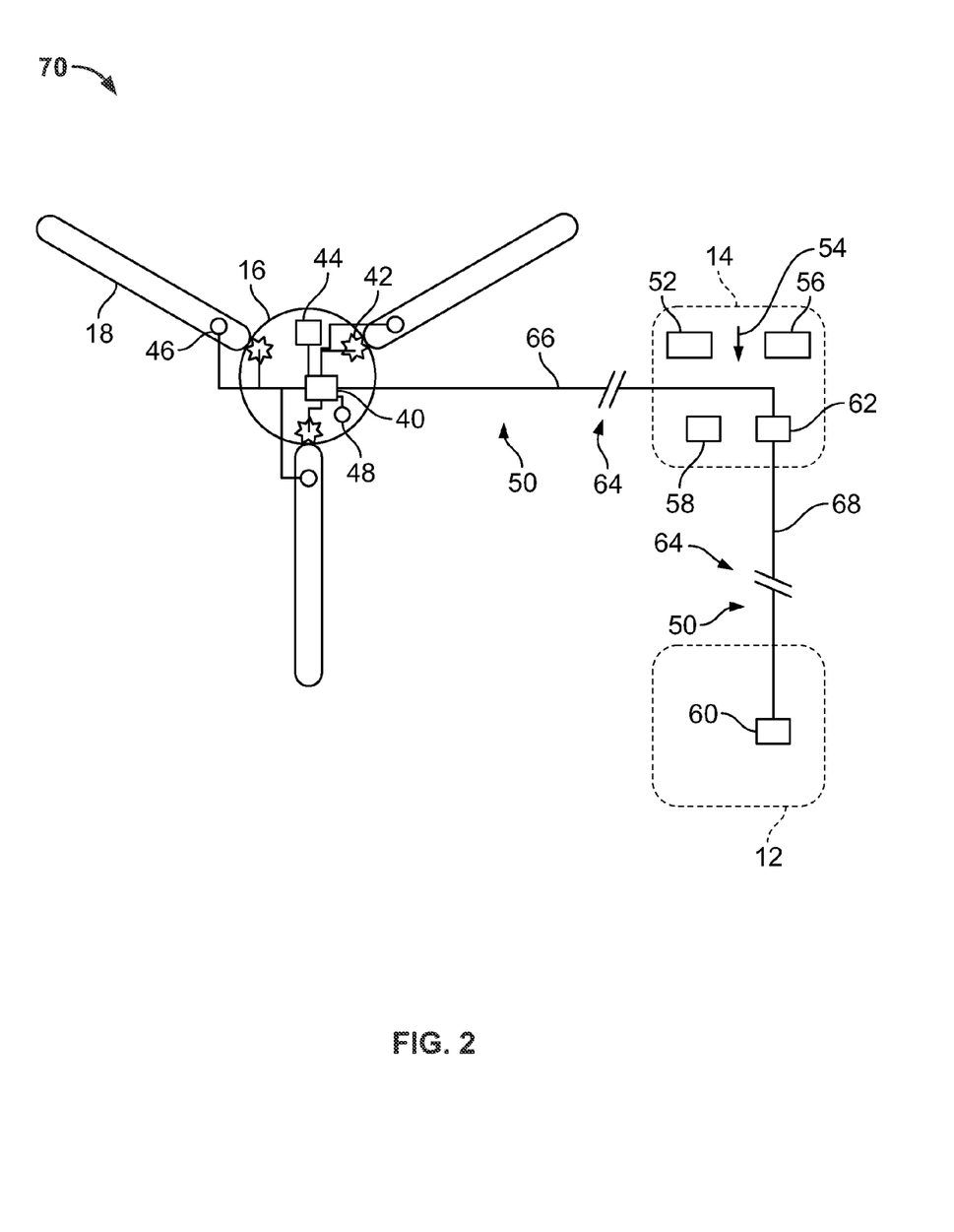
FIG. 2 is a schematic view of an exemplary wind turbine pitch control system that may be used with the wind turbine shown in FIG. 1.

FIG. 2 illustrates a schematic view of an exemplary wind turbine pitch control system 70 that may be used with wind turbine 10 (shown in FIG. 1). Control system 70 is coupled to components within hub 16, blades 18, nacelle 14, and tower 12. In the exemplary embodiment, hub 16 includes a pitch controller 40, at least one pitch drive 42, a hub backup power supply 44, and a hub sensor 48. Pitch controller 40 is coupled to blades 18 through pitch drives 42. In one embodiment, hub 16 includes three pitch drives 42, such that pitch controller 40 is coupled to each blade 18 via a respective pitch drive 42.

In the exemplary embodiment, pitch controller 40 is located within hub 16 and controls, for example, a pitch angle (not shown) and/or a relative position (not shown) of blades 18. Moreover, pitch controller 40 communicates with a wind turbine controller 60 via a communication network 50. In the exemplary embodiment, pitch controller 40 includes a programmable logic controller (PLC). In an alternative embodiment, pitch controller 40 includes a microprocessor, a microcontroller, a field programmable gate array (FPGA) or any other programmable circuit that enables pitch controller 40 to operate as described herein. As used herein, the term "controls" includes, but is not limited to only, issuing commands to be implemented by exercising oversight and supervision of, and/or directing operation of, one or more subject components. The term "control" also includes a regulation-type of control, e.g. a feedback-loop regulation.

In the exemplary embodiment, pitch drives 42 receive one or more pitch commands from pitch controller 40, and in response, rotate blades 18 to a position and/or pitch angle identified by the pitch commands. Pitch drives 42 may rotate blades 18 using, for example, hydraulic, electric, or gear-driven means. In the exemplary embodiment, hub sensor 48 determines a speed of rotation of and/or a load induced to hub 16. Hub backup power supply 44 may include, for example, a battery, a magnetic energy storage device, or one or more capacitors. Hub backup power supply 44 provides electrical power to components within hub 16, such as pitch controller 40, pitch drives 42, and hub sensor 48, in the event of a communication loss 64 with nacelle 14. As used herein, the term "communication loss" includes unreliable or broken data and/or control communication conditions between the respective components, and also includes communication failures, such as for example, due to hardware failure, software failure, and/or network failure, and unstable communication between the components. For example, a communication loss 64 may result from one or more lost or corrupted signals or packets of data from communication network 50, or from a reduction or an increase of signal strength in one or more signals in communication network 50. As used herein, a "communication loss" may also result from a loss of electrical power between two components. Moreover, and as shown in FIG. 2, a communication loss 64 may also occur due to a failure in a nacelle-hub network 66 or in a nacelle-tower network 68. Moreover, a communication loss 64 may occur due to a failure in pitch controller 40, in wind turbine controller 60, and/or in any other component used in communication network 50.

In the exemplary embodiment, each blade 18 includes a blade sensor 46 coupled thereto. Each blade sensor 46 is also coupled to pitch controller 40. Blade sensors 46 enable a speed of rotation of and/or a load induced to each blade 18 to be determined.

In the exemplary embodiment, nacelle 14 includes a gearbox 52, a brake 54, a generator 56, a battery 58, and a nacelle controller 62. In an alternative embodiment, nacelle 14 does not include gearbox 52. In another alternative embodiment, nacelle 14 does not include nacelle controller 62. In the exemplary embodiment, gearbox 52 enables an augmentation of a rotation of a main rotor shaft (not shown) driven by the rotation of blades 18, thereby inducing a higher amount of rotational energy to generator 56. Brake 54 may provide emergency stopping power to generator 56 and/or to wind turbine 10 operation in an event of a fault or other error condition. Generator 56 transforms rotational energy of the main rotor shaft into electrical energy. Generator 56 may be of any suitable type, for example and without limitation, a wound rotor induction generator, such as a doubly fed induction generator. Battery 58 provides backup electrical power to nacelle 14 and tower 12 components in the event of a communication loss 64.

Nacelle controller 62 controls the operation of components within nacelle 14, such as gearbox 52, brake 54, generator 56, and/or battery 58. In the exemplary embodiment, nacelle controller 62 is coupled to pitch controller 40 and to wind turbine controller 60 via communication network 50. More specifically, in the exemplary embodiment, nacelle controller 62 is coupled to pitch controller 40 via a nacelle-hub network 66, and to wind turbine controller 60 via a nacelle-tower network 68.

In the exemplary embodiment, wind turbine controller 60 is located within tower 12. In an alternative embodiment, wind turbine controller 60 is located within nacelle 14. Moreover, in the exemplary embodiment, wind turbine controller 60 operates as a master controller of wind turbine 10 and of pitch control system 70, and may include a computer or other processor configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Wind turbine controller 60 may control other controllers of wind turbine 10, such as pitch controller 40, communicate with other wind turbines (not shown) and/or a wind farm management system (not shown), and perform error handling and operational optimization. Moreover, wind turbine controller 60 may also execute a SCADA (Supervisory, Control and Data Acquisition) program.

Hub 16 is coupled to nacelle 14 and tower 12 via communication network 50. Communication network 50 includes nacelle-hub network 66 and nacelle-tower network 68. More specifically, in the exemplary embodiment, hub 16 is coupled to nacelle 14 via nacelle-hub network 66, and nacelle 14 is coupled to tower 12 via nacelle-tower network 68. Moreover, pitch controller 40 is coupled to wind turbine controller 60 via nacelle-hub network 66 and via nacelle-tower network 68. In the exemplary embodiment, nacelle-hub network 66 uses a slip ring connection to transmit signals via a serial communication protocol or another communication protocol, such as broadband over power line (BPL). In an alternative embodiment, nacelle-hub network 66 includes any other connection that enables network 66 to operate as described herein. In the exemplary embodiment, nacelle-tower network 68 includes one or more of such connections as Ethernet LAN, wireless LAN, a Controller Area Network (CAN) bus, fiber optic connection, or any other communication connection (all not shown) that enables nacelle-tower network 68 to operate as described herein.

During operation, rotation of blades 18 causes rotation of the main rotor shaft, resulting in electricity being produced by generator 56. Wind turbine controller 60 monitors rotational speed and loading of blades 18 using blade sensors 46 and/or hub sensor 48. If wind speed exceeds a rated speed of wind turbine 10, wind turbine controller 60 transmits control commands to pitch controller 40 to increase or decrease the pitch angle of blades 18 as necessary to facilitate reducing the lift induced to blades 18 by the wind. In the exemplary embodiment, wind turbine controller 60 transmits such control commands via communication network 50 to pitch controller 40. Upon receipt of the control commands, pitch controller 40 implements the control commands by directing pitch drives 42 to rotate blades 18 by an amount specified in the control commands. Specifically, in response to control commands, pitch drives 42 rotate blades 18 to the pitch angle specified by pitch controller 40.

In the exemplary embodiment, pitch control system 70 relies at least partially upon communication network 50 for communication between wind turbine controller 60 and pitch controller 40. However, if communication network 50 is error-prone, or if one or more components of pitch controller 40 and/or of wind turbine controller 60 are error-prone or faulty, a loss of communication between wind turbine controller 60 and pitch controller 40 may result. In the exemplary embodiment, as described in more detail below, pitch control system 70 is programmed to respond to such situations to facilitate preventing damage to wind turbine 10 and to facilitate reducing an amount of time that wind turbine 10 operates at reduced electrical output, with no electrical output, and/or with a reduced operating efficiency.

Figure 3:
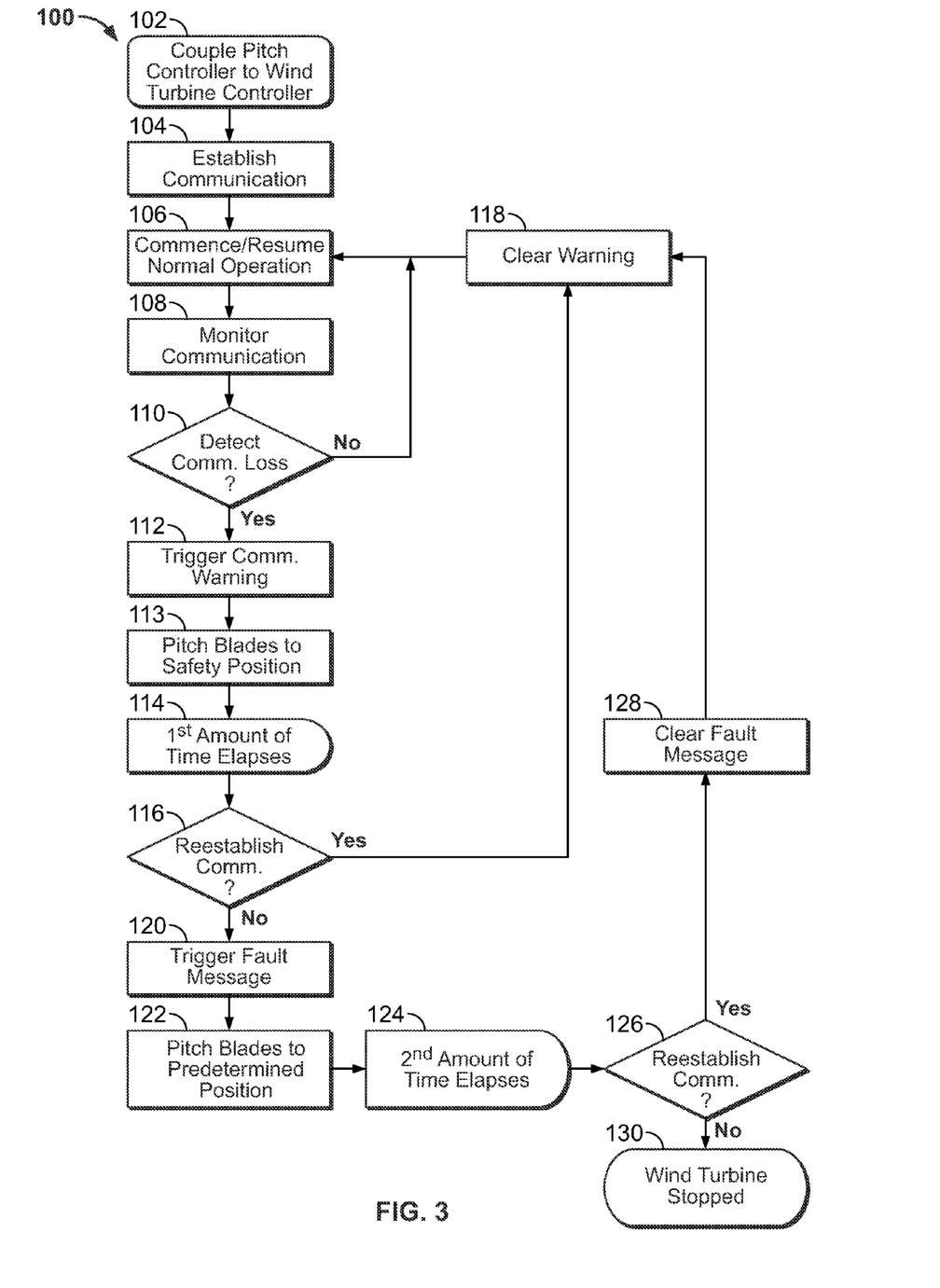
FIG. 3 is a flowchart of an exemplary method for operating the wind turbine shown in FIG. 1.

FIG. 3 illustrates a flowchart of an exemplary method 100 for use in operating wind turbine 10 (shown in FIG. 1) during a communication loss 64 (shown in FIG. 2). In the exemplary embodiment, pitch controller 40 (shown in FIG. 2) is coupled 102 to wind turbine controller 60 (shown in FIG. 2). More specifically, in the exemplary embodiment, pitch controller 40 is coupled 102 to wind turbine controller 60 via communication network 50 (shown in FIG. 2).

After pitch controller 40 has been coupled 102 to wind turbine controller 60, communication is established 104 between pitch controller 40 and wind turbine controller 60. In the exemplary embodiment, establishing 104 communication includes one or more initial "handshaking" procedures that are used to determine, for example, a data transfer rate, one or more error protocols, and/or a synchronization of internal clocks. Moreover, the handshaking procedures may include transmitting predetermined fault parameters by wind turbine controller 60 to pitch controller 40 and to wind turbine controller 60 for use in an event of a communication loss 64. In the exemplary embodiment, such fault parameters include a fault pitch rate, a fault pitch angle, a safety pitch rate, and a safety pitch angle. Wind turbine controller 60 may establish the initial, predetermined fault parameters by referring to, for example, one or more values or algorithms stored in a memory location by a software program, such as a SCADA program, or by referencing one or more values or algorithms stored in firmware, or hard-wired into a circuit, of wind turbine controller 60. Alternatively, a remote user may access wind turbine controller 60 and establish the fault parameters to be used in the event of a communication loss 64 before communication is established 104 between pitch controller 40 and to wind turbine controller 60. The fault pitch angle is defined as the pitch angle to which blades 18 are driven by pitch controller 40 and pitch drives 42 (shown in FIG. 2) in the event of a communication loss 64. In the exemplary embodiment, the predetermined fault pitch angle is the pitch angle of blades 18 (shown in FIG. 2) at which wind is substantially unable to induce lift to blades 18 (often referred to as a "feathered" position). More specifically, the fault pitch rate is an angular rate of rotation induced to blades 18 by pitch controller 40 and pitch drives 42 in the event of a communication loss 64. In the exemplary embodiment, the predetermined fault pitch rate is between about 1 and about 6 degrees per second. In another embodiment, the predetermined fault pitch rate is between about 2 and about 4 degrees per second.

In an alternative embodiment, wind turbine controller 60 may establish the initial, predetermined fault parameters for pitch controller 40 and wind turbine controller 60 to use in the event of a communication loss 64 after establishing 104 communication, but before commencing normal operations 106 of wind turbine 10. In such an embodiment, wind turbine controller 60 transmits the predetermined fault parameters to pitch controller 40. Pitch controller 40 stores the fault parameters, for example, by writing the parameters to a memory location or to an internal register, or by configuring a field programmable gate array ("FPGA") to transmit the parameters to pitch drives 42 during a communication loss 64.

After communication is established 104, wind turbine 10 commences normal operations 106. During normal operations 106, wind turbine 10 generates electrical power from wind and wind turbine controller 60 facilitates optimizing an amount of lift induced to blades 18 by wind. Wind turbine controller 60 receives sensor data from sensors 46 and 48 (both shown in FIG. 2) respectively, and sends control commands, including commands to pitch blades 18 at an identified angle, to pitch controller 40 via communication network 50. Pitch controller 40 receives the control commands from wind turbine controller 60 and directs pitch drives 42 to induce the identified pitch angle to blades 18. Pitch drives 42 rotate blades 18 to the identified pitch angle. More specifically, during normal operations 106, wind turbine controller 60 determines an expected pitch angle of blades 18 that is approximately equal to the angle identified in the control commands transmitted to pitch controller 40. As such, during normal operations 106, pitch controller 40 directs pitch drives 42 to induce a pitch angle to blades 18 that is approximately equal to the expected pitch angle determined by wind turbine controller 60. As such, during normal operations 106, an actual pitch angle of blades 18 is approximately equal to the expected pitch angle of wind turbine controller 60.

Moreover, during normal operations 106, based on sensor data received from sensors 46 and 48, respectively, wind turbine controller 60 may change the predetermined fault pitch angle and/or fault pitch rate that had previously been transmitted to pitch controller 40. For example, if blades 18 are operating with a high rotational speed and/or high loading due to the current wind conditions, wind turbine controller 60 can establish new fault parameters, such as the fault pitch rate, fault pitch angle, safety pitch rate, and safety pitch angle, for pitch controller 40 to use during a communication loss 64. For example, in high wind conditions, wind turbine controller 60 may establish higher fault and safety pitch rates, and/or higher fault and safety pitch angles, as compared to the predefined fault parameters employed during normal operations 106 in lesser wind conditions. After wind turbine controller 60 establishes new fault parameters to be used during a communication loss 64, wind turbine controller 60 transmits the new fault parameters to pitch controller 40, and pitch controller 40 stores the new fault parameters as described above.

During normal operations 106, pitch controller 40 and wind turbine controller 60 monitor 108 communication between controllers 60 and 40, respectively. Pitch controller 40 and wind turbine controller 60 can detect 110 a communication loss 64 within communication network 50. In the exemplary embodiment, pitch controller 40 and wind turbine controller 60 each include an internal counter (not shown) that independently increments a value representing the current packet count upon a successful receipt of a packet of data. For example, wind turbine controller 60 transmits a packet of data to pitch controller 40 that includes a value representing the current packet count, as calculated by the internal counter of wind turbine controller 60. When pitch controller 40 receives the packet with the included packet count value, pitch controller 40 compares the transmitted packet count value with a value representing the current packet count as determined based on the internal counter of pitch controller 40. If the value from the internal counter of pitch controller 40 is equal to the packet count value transmitted from wind turbine controller 60, then pitch controller 40 determines that no packets have been lost or corrupted and that no communication loss 64 exists or has occurred. The operation is identical when pitch controller 40 transmits a packet of data to wind turbine controller 60. If no communication loss 64 is detected 110, wind turbine 10 remains in normal operations 106 and communication between pitch controller 40 and wind turbine controller 60 is continuously monitored 108.

However, if pitch controller 40 and/or wind turbine controller 60 detects 110 a communication loss 64, then the detecting 110 component, i.e. controller 40 and/or controller 60, triggers 112 a communication warning. Pitch controller 40 and/or wind turbine controller 60 may trigger 112 the communication warning, for example, by activating a control flag in an internal register, by writing a value to an internal memory location, and/or by energizing a warning light or light-emitting diode (LED). The communication warning may also be triggered 112 by transmitting a warning message to the other controller, 40 or 60 respectively, to ensure that both controllers, 40 and 60 respectively, are informed of communication loss 64.

In the exemplary embodiment, after the communication warning has been triggered 112, pitch controller 40 directs pitch drives 42 to pitch 113 blades to a predetermined safety position. In the exemplary embodiment, the predetermined safety position is the predetermined safety pitch angle contained in the fault parameters described above. As such, the predetermined safety position may be initially determined and transmitted to pitch controller 40 by wind turbine controller 60 when communication is initially established 104, or after establishing 104 communication. Moreover, the predetermined safety position may be modified or adjusted by wind turbine controller 60 during normal operations 106 based on the current wind conditions, as described above. Wind turbine controller 60 changes its expected pitch angle to synchronize with the safety pitch angle, at the safety pitch rate, as described above. In the exemplary embodiment, the predetermined safety position is a pitch angle less than the pitch angle of the feathered position. In another embodiment, the predetermined safety position is approximately 10°. In an alternative embodiment, blades 18 are not pitched 113 to a predetermined safety position during execution of method 100.

After triggering 112 the communication warning, neither pitch controller 40 nor wind turbine controller 60 is activated until a first predetermined amount of time has elapsed 114, to ensure communication between pitch controller 40 and wind turbine controller 60 has not been restored or is not restorable in a short period of time. For example, in the exemplary embodiment, a first predetermined amount of time between 100 milliseconds and 1 second must elapse 114. In another embodiment, pitch controller 40 and wind turbine controller 60 wait a first predetermined amount of time of approximately 0.5 seconds for communication to be restored. While waiting for the first predetermined amount of time to elapse 114, pitch controller 40 and wind turbine controller 60 attempt to reestablish 116 communication. In the exemplary embodiment, communication is reestablished 116 using the same procedure of exchanging handshaking signals or packets as was used when communication was initially established 104.

If pitch controller 40 and wind turbine controller 60 reestablish 116 communication, then pitch controller 40 and/or wind turbine controller 60 clear 118 the communication warning and normal operations 106 are resumed. The communication warning may be cleared 118, by resetting a control flag in an internal register, writing a value to an internal memory location, and/or by de-energizing a warning light or light-emitting diode (LED), for example. Moreover, the communication warning may also by cleared 118, by transmitting a message to pitch controller 40 or to wind turbine controller 60, indicating that communication has been reestablished 116.

If communication has not been reestablished 116 after the first predetermined amount of time has elapsed 114, pitch controller 40 and/or wind turbine controller 60 triggers 120 a fault message. Pitch controller 40 and/or wind turbine controller 60 may trigger 120 the fault message, for example, by activating a control flag in an internal register, by writing a value to an internal memory location, and/or by energizing a fault light or light-emitting diode (LED). The fault message may be triggered 120 by transmitting the fault message to pitch controller 40 and/or to wind turbine controller 60, to ensure that controllers, 40 and 60 respectively, are informed of a persisting communication loss 64.

After triggering 120 the fault message, pitch controller 40 independently pitches 122 blades to a predetermined position at a predetermined angular rate. The predetermined position is the most recent fault pitch angle that wind turbine controller 60 transmitted to pitch controller 40 when communication was established 104 and/or during normal operations 106. Likewise, the predetermined angular rate is the most recent fault pitch rate that wind turbine controller 60 transmitted to pitch controller 40 when communication was established 104 and/or during normal operations 106. As used herein, the term "independently" refers to an operation of a component absent direction or control from another component. As such, pitch controller 40 independently pitches 122 blades during a communication loss 64, i.e., in the event that wind turbine controller 60 is unable to communicate with pitch controller 40. In the exemplary embodiment, the predetermined position is an angle corresponding to a feathered position of blades 18.

While pitch controller 40 independently pitches 122 blades to the predetermined position at the predetermined angular rate, wind turbine controller 60 independently changes its expected pitch angle at the same predetermined angular rate used by pitch controller 40. In other words, when pitch controller 40 directs pitch drives 42 to pitch 122 blades to the predetermined position at the predetermined angular rate, wind turbine controller 60 adjusts its expected pitch angle accordingly. As such, wind turbine controller 60 maintains synchronization of its expected pitch angle with the actual pitch angle of blades 18 during a communication loss 64. Thus, wind turbine controller 60 and pitch controller 40 facilitate resuming normal operations 106 once communication is reestablished 116. As a result, potential problems often associated with the resumption of communication that may occur with blades 18 being at one pitch angle and wind turbine controller 60 expecting a different or second pitch angle are avoided.

After pitch controller 40 independently pitches 122 blades to the predetermined position, pitch controller 40 and wind turbine controller 60 wait for a second predetermined amount of time to elapse 124, to ensure that communication has not been restored or is not restorable in a short period of time. In the exemplary embodiment, the second predetermined amount of time is between about 0.5 seconds and about 2 seconds. In another embodiment, the second predetermined amount of time is approximately 1 second. In the exemplary embodiment, while pitch controller 40 and wind turbine controller 60 are waiting for the second predetermined amount of time to elapse 124, pitch controller 40 and wind turbine controller 60 also attempt to reestablish 126 communication, as described above. In the exemplary embodiment, blades 18 are pitched 122 to the predetermined position at substantially the same time, or with overlapping times, as waiting for the second predetermined amount of time to elapse 124, and while attempting to reestablish 126 communication.

If pitch controller 40 and wind turbine controller 60 successfully reestablish 126 communication before the second predetermined amount of time has elapsed 124, pitch controller 40 and/or wind turbine controller clear 128 the fault message that had been previously triggered 120. More specifically, in the exemplary embodiment, the fault message may be cleared 128, for example, by resetting a control flag in an internal register, by writing a value to an internal memory location, or by deenergizing a fault light or light-emitting diode (LED). After clearing 128 the fault message, pitch controller 40 and/or wind turbine controller 60 clear 118 the communication warning as described above. After clearing 118 the communication warning, pitch controller 40 and wind turbine controller 60 resume normal operations 106. In an alternative embodiment, the sequence of clearing 128 the fault message and clearing 118 the communication warning are interchangeable, such that they may occur in any order, or at substantially the same time.

If pitch controller 40 and wind turbine controller 60 are unable to reestablish 126 communication before the second predetermined amount of time has elapsed 124, pitch controller 40 maintains blades 18 in the predetermined position until the rotation of blades 18 is stopped. At such time, wind turbine 10 stops operation 130, and remains in a fault state until reset by a remote or local user.

The examples used herein are illustrative only, and are not meant to be limited to the elements of those examples.

The above-described embodiments provide an efficient and cost-effective method for operating a wind turbine during a communication loss. The method improves the ability of the wind turbine to operate during a communication loss and to remain in operation after communication is restored. The exemplary embodiment provides two waiting periods during which communication may be restored, and after which, the wind turbine may resume normal operations. This enables the wind turbine to operate more efficiently and to remain in operation during communication losses that would otherwise shut down a wind turbine.

Moreover, the exemplary embodiment facilitates protecting blades and other wind turbine components during a communication loss. The exemplary embodiment enables the pitch controller to drive the blades to a feathered position if the communication loss persists. This facilitates preventing blades from exceeding the rated speed of the wind turbine when the wind turbine controller is unable to limit the speed of the blades, thereby damaging the wind turbine. An alternative embodiment enables the pitch controller to pitch the blades to an intermediate safety position while waiting for communication to be restored. This embodiment and the exemplary embodiment facilitate protecting the blades and other components of the wind turbine from being damaged during a communication loss.

Exemplary embodiments of a wind turbine, a pitch controller, and a method for operating a wind turbine during a loss of communication are described above in detail. The method, wind turbine, and controller are not limited to the specific embodiments described herein, but rather, components of the turbine and/or controller and/or steps of the method may be utilized independently and separately from other components and/or steps described herein. For example, the controller may also be used in combination with other systems and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine during a loss of communication, the wind turbine including at least one wind turbine blade, a wind turbine controller, and a pitch controller coupled to the at least one wind turbine blade and to the wind turbine controller, said method comprising:
   establishing communication between the pitch controller and the wind turbine controller; and,
   detecting a loss of communication between the pitch controller and the wind turbine controller, wherein after a loss of communication is detected, said method further comprises:
   pitching the at least one wind turbine blade to a first position using the pitch controller;
   independently calculating an expected pitch position of the at least one wind turbine blade by the wind turbine controller during the loss of communication such that the expected pitch position is substantially equal to an actual pitch position of the at least one wind turbine blade during the loss of communication;

maintaining the at least one wind turbine blade at the first position until a first predetermined amount of time has elapsed;

independently pitching the at least one wind turbine blade to a second position;

waiting for a second predetermined amount of time to elapse; and, maintaining the at least one wind turbine blade in the second position until a rotation of the at least one wind turbine blade stops.

2. A method in accordance with claim 1, wherein said method further comprises triggering a communication warning after a loss of communication is detected.

3. A method in accordance with claim 1, wherein said method further comprises triggering a fault message before independently pitching the at least one wind turbine blade to the second position.

4. A method in accordance with claim 1, wherein said method further comprises resuming normal operations of the wind turbine after determining communication has been reestablished between the pitch controller and the wind turbine controller.

5. A method in accordance with claim 1, wherein a pitch angle of the first position is less than a pitch angle of the second position.

6. A method in accordance with claim 1, wherein independently pitching the at least one wind turbine blade to the second position further comprises pitching the at least one wind turbine blade to a second position at the predetermined angular rate.

7. A method in accordance with claim 6, wherein said method further comprises calculating an expected pitch rate that changes the orientation of the at least one wind turbine blade at substantially the predetermined angular rate, wherein the expected pitch rate substantially matches the pitch angle of the at least one wind turbine blade at a given time.

8. A method in accordance with claim 7, wherein said method further comprises modifying at least one of the first position, the second position, and the predetermined angular pitch rate of the at least one wind turbine blade during operation of the wind turbine.

9. A wind turbine, comprising:
a hub;
at least one blade coupled to said hub;
a wind turbine controller; and,
a pitch controller coupled to said at least one blade and to said wind turbine controller, said pitch controller configured to:
establish communication with said wind turbine controller;
detect a loss of communication with said wind turbine controller, wherein after a loss of communication is detected, said pitch controller is further configured to:
pitch said at least one blade to a first position;
maintain said at least one blade at the first position until a first predetermined amount of time has elapsed;
independently pitch said at least one blade to a second position;
wait a second predetermined amount of time for the communication to be restored; and,
maintain said at least one blade in the second position until a rotation of said at least one blade stops, wherein said wind turbine controller is configured to independently calculate an expected pitch position of said at least one blade during the loss of communication such that the expected pitch position is substantially equal to an actual pitch position of said at least one blade during the loss of communication.

10. A wind turbine in accordance with claim 9, wherein said wind turbine controller is further configured to trigger a communication warning after a detection of a loss of communication.

11. A wind turbine in accordance with claim 9, wherein said wind turbine controller is further configured to trigger a fault message before said at least one blade is independently pitched to the second position.

12. A wind turbine in accordance with claim 9, wherein said wind turbine controller is further configured to resume normal operations of said turbine after communication between said pitch controller and said wind turbine controller is reestablished.

13. A wind turbine in accordance with claim 9, wherein said wind turbine controller is further configured to pitch said at least one blade to a predetermined safety position after a loss of communication is detected.

14. A wind turbine in accordance with claim 9, wherein said wind turbine controller is further configured to independently pitch said at least one blade at a predetermined angular rate.

15. A wind turbine in accordance with claim 14, wherein said wind turbine controller is further configured to calculate an expected pitch rate that changes at the predetermined angular rate of said at least one blade, at a rate that substantially matches the pitch angle of said at least one blade at a given time.

16. A wind turbine in accordance with claim 15, wherein said wind turbine controller is further configured to modify the first position and the predetermined angular pitch rate of said at least one blade during operation of said wind turbine.

17. A control system coupled to at least one wind turbine blade, said control system comprising:
a wind turbine controller; and,
a pitch controller coupled to said wind turbine controller, said pitch controller configured to:
establish communication with said wind turbine controller; and,
detect a loss of communication with said wind turbine controller, wherein after a loss of communication is detected, said pitch controller is further configured to:
pitch the at least one wind turbine blade to a first position;
maintain the at least one wind turbine blade at the first position until a first predetermined amount of time has elapsed;
independently pitch the at least one wind turbine blade to a second position;
wait a second predetermined amount of time for the communication to be restored; and,
maintain the at least one wind turbine blade in the second position until a rotation of the at least one wind turbine blade stops, wherein said wind turbine controller is configured to independently calculate an expected pitch position of the at least one wind turbine blade during the loss of communication such that the expected pitch position is substantially equal to an actual pitch position of the at least one wind turbine blade during the loss of communication.

18. A control system in accordance with claim 17, wherein said pitch controller is further configured to independently pitch the at least one wind turbine blade at a predetermined angular rate.

19. A control system in accordance with claim 17, wherein said pitch controller is further configured to resume normal operations of said pitch controller after communication between said pitch controller and said wind turbine controller is reestablished.

20. A control system in accordance with claim 17, wherein a pitch angle of the first position is less than a pitch angle of the second position.

* * * * *